No. 658,783. Patented Oct. 2, 1900.
G. I. KING.
CAR CONSTRUCTION.
(Application filed Feb. 26, 1900.)

(No Model.) 9 Sheets—Sheet 1.

Attest:
Wm H Scott
Ralph Kalish

Inventor:
George I. King.
by Bakewell & Cornwall
Attys.

No. 658,783. Patented Oct. 2, 1900.
G. I. KING.
CAR CONSTRUCTION.
(Application filed Feb. 26, 1900.)
(No Model.) 9 Sheets—Sheet 2.
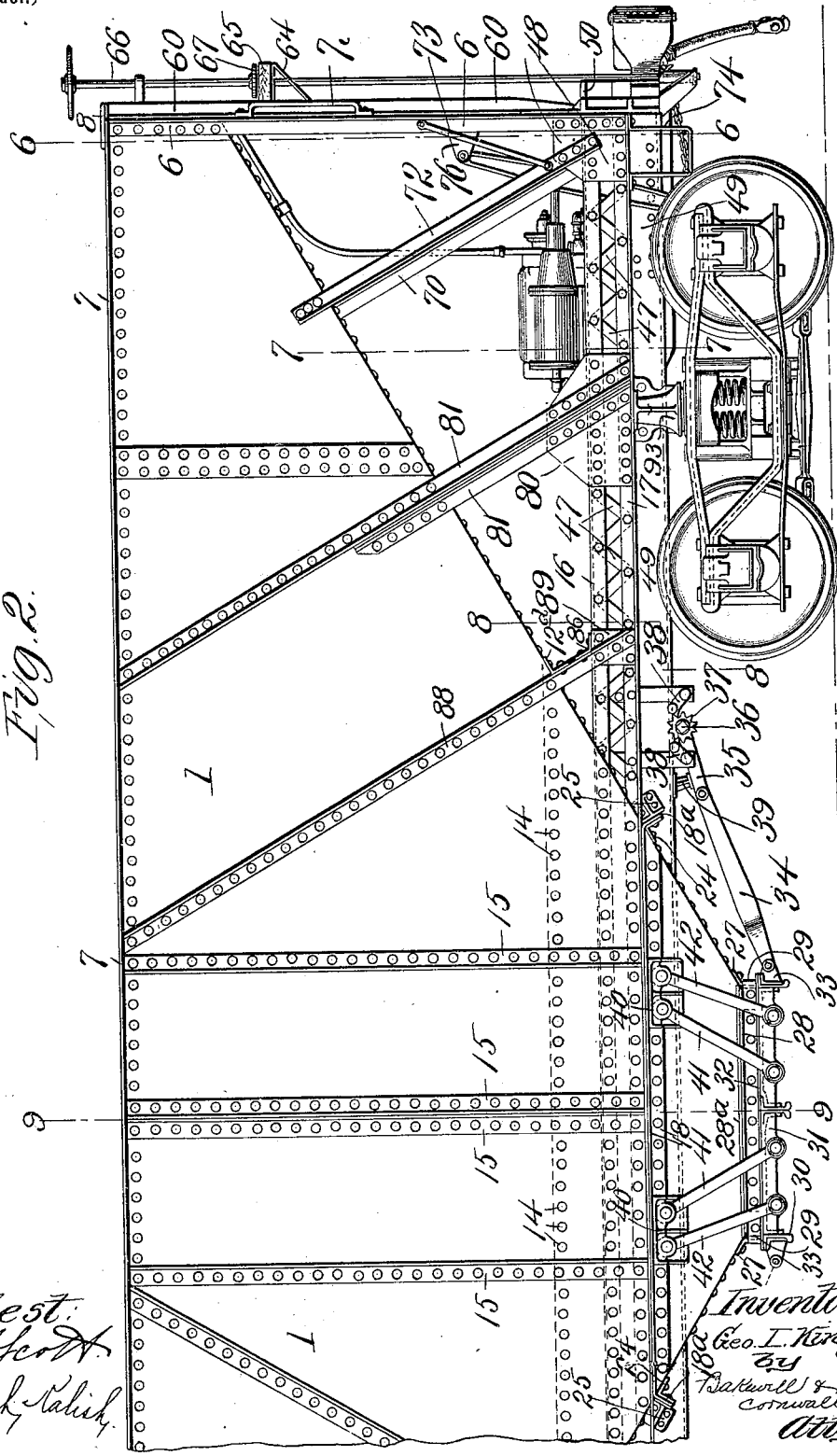

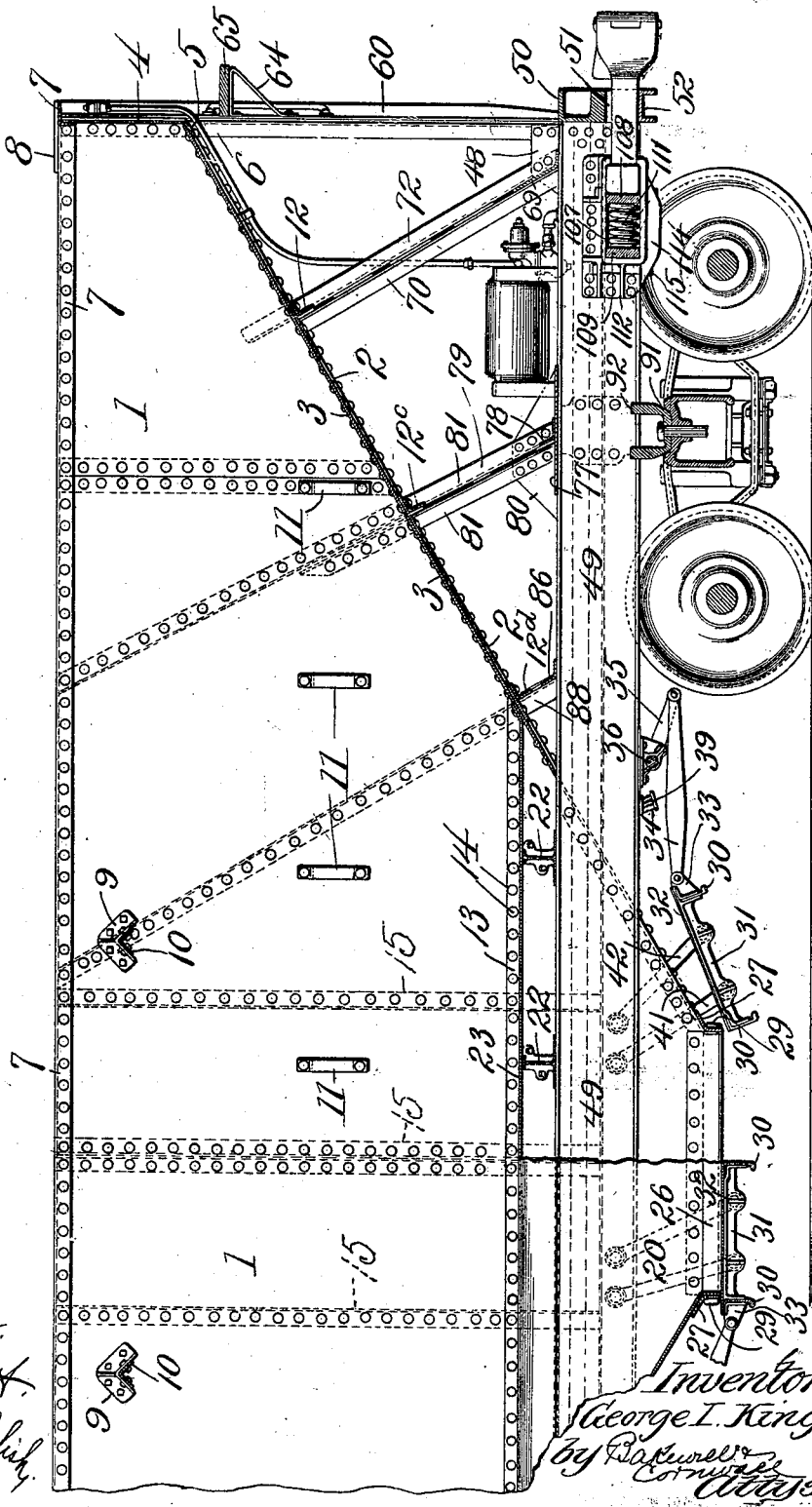

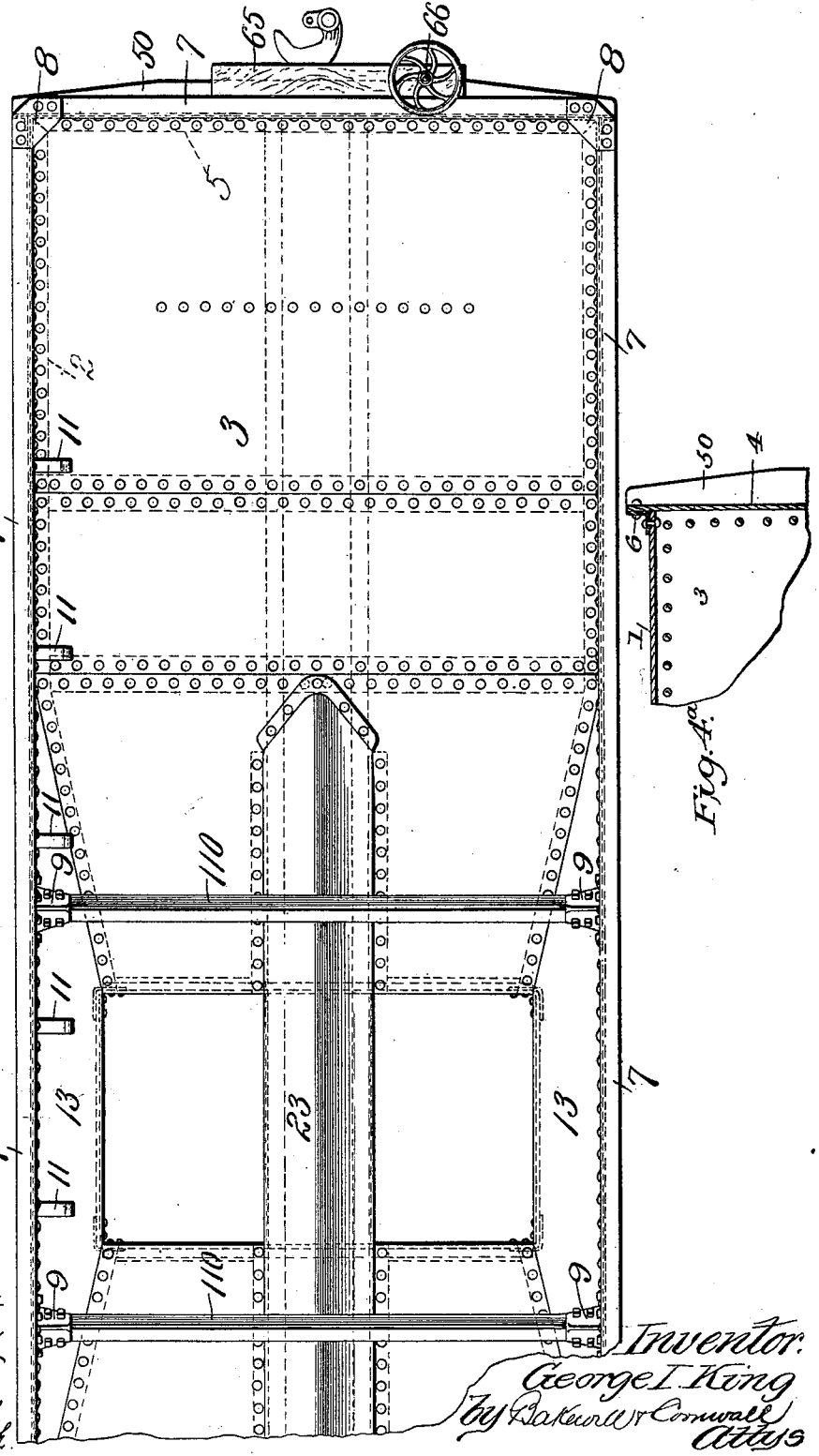

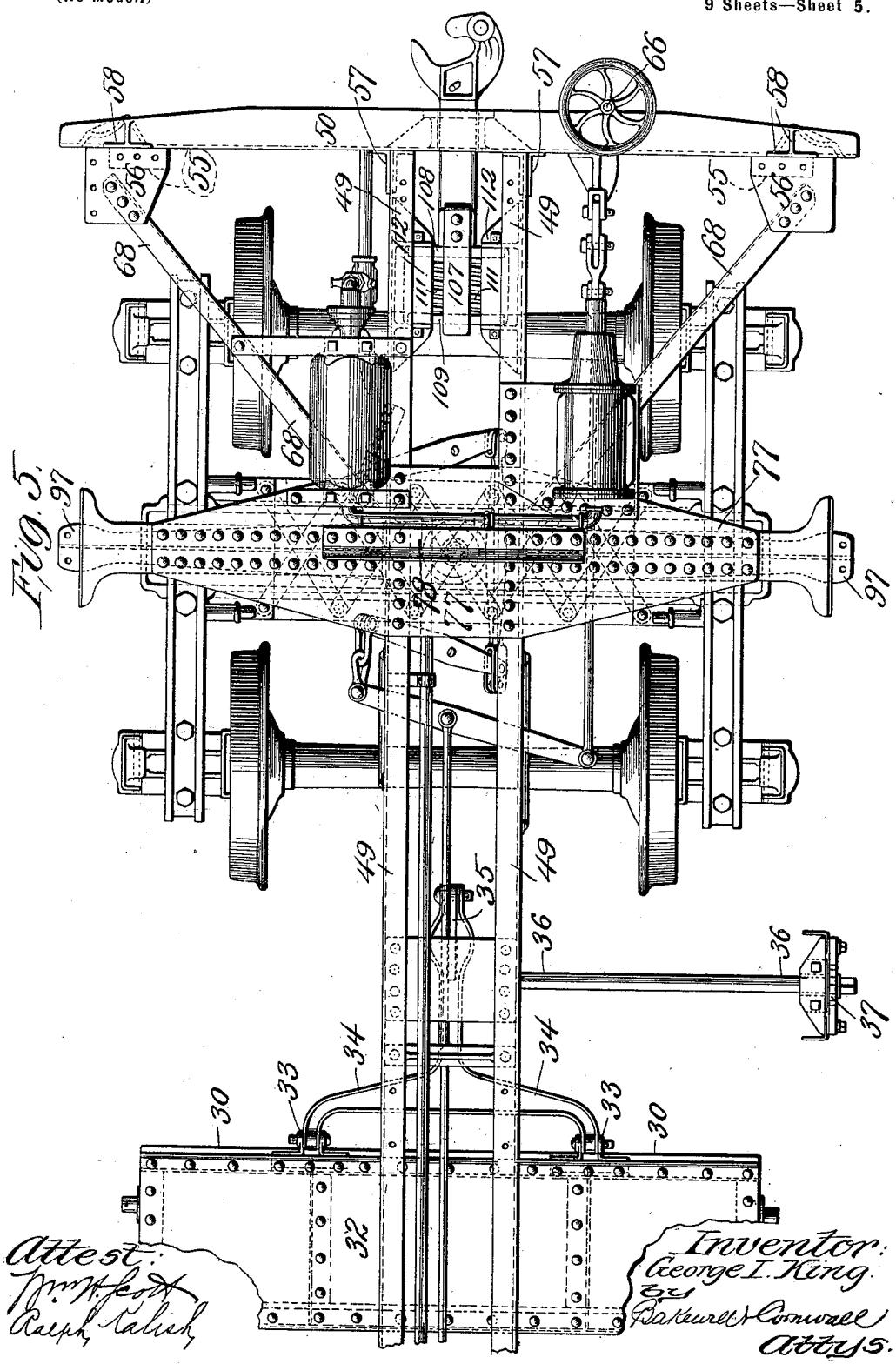

No. 658,783. Patented Oct. 2, 1900.
G. I. KING.
CAR CONSTRUCTION.
(Application filed Feb. 26, 1900.)
(No Model.) 9 Sheets—Sheet 6.
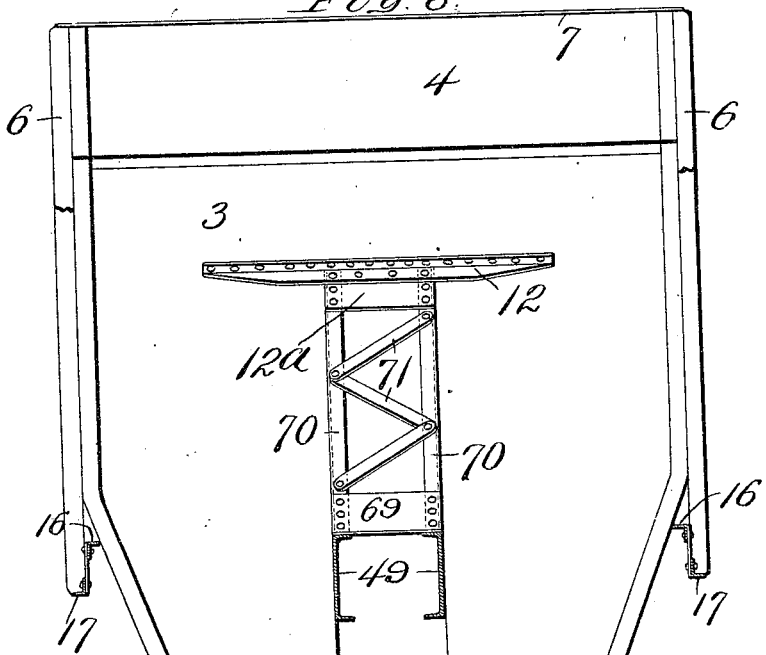
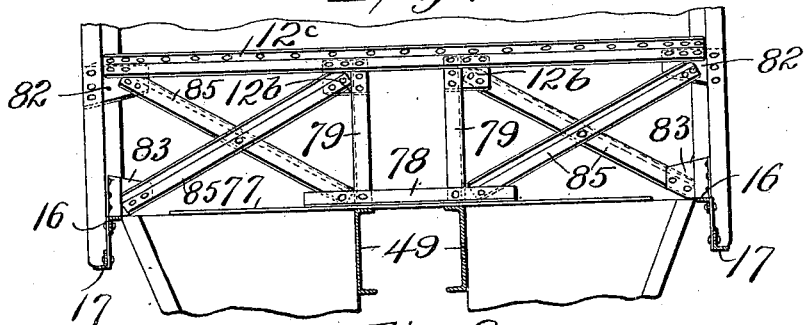
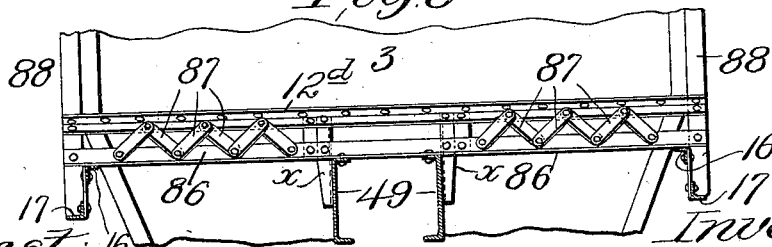
Attest:
Wm H Scott
Ralph Kalish
Inventor
George I. King
by Bakewell & Cornwall
Attys.

No. 658,783.  
G. I. KING.  
CAR CONSTRUCTION.  
(Application filed Feb. 26, 1900.)  
Patented Oct. 2, 1900.

(No Model.)  
9 Sheets—Sheet 7.

Attest:  
Inventor  
George I. King.  
by Bakewell & Cornwall  
Attys.

No. 658,783. Patented Oct. 2, 1900.
G. I. KING.
CAR CONSTRUCTION.
(Application filed Feb. 26, 1900.)
(No Model.) 9 Sheets—Sheet 8.
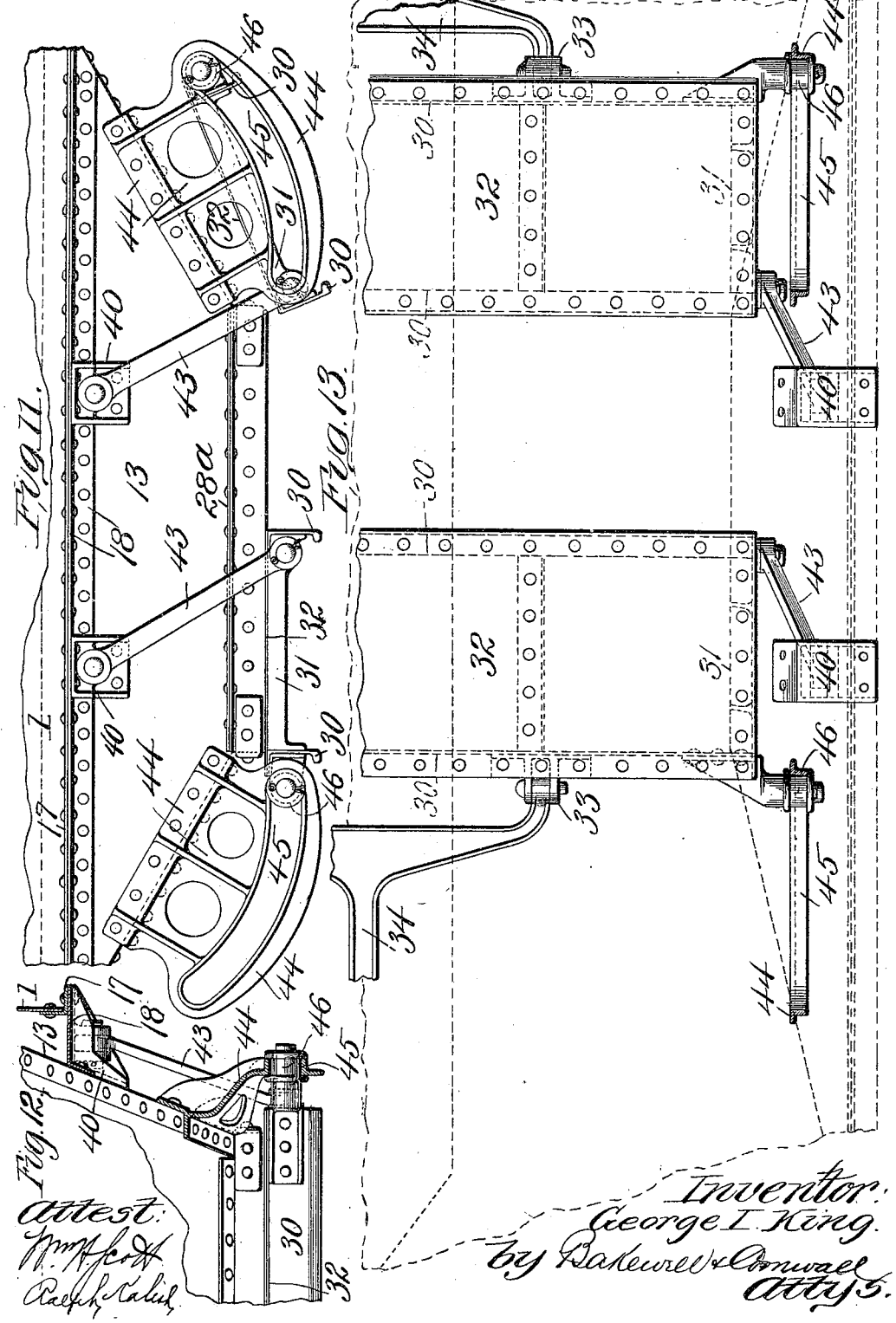
Inventor
George I. King.
by Bakewell & Cornwall
Attys.

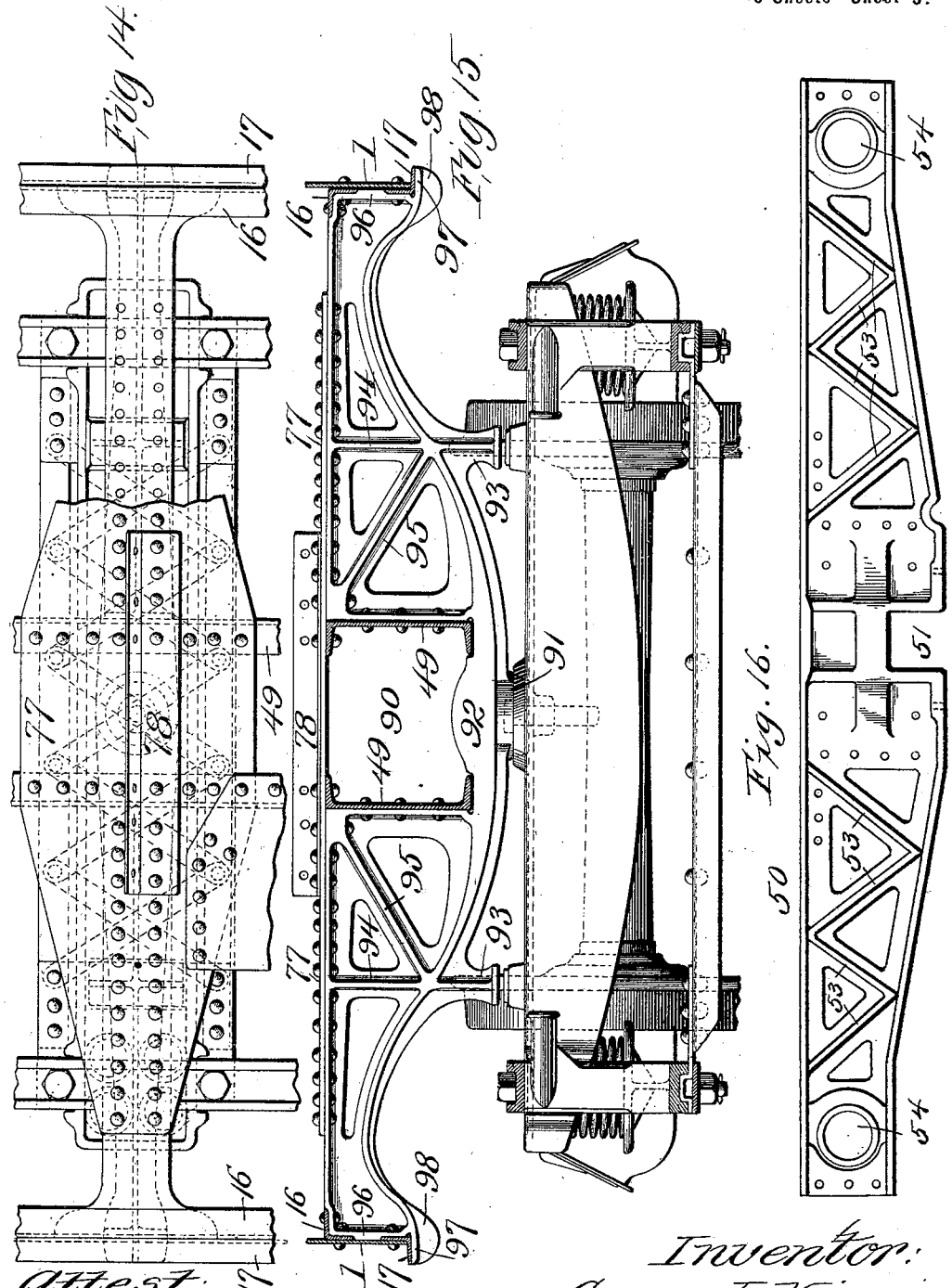

UNITED STATES PATENT OFFICE.

GEORGE I. KING, OF DETROIT, MICHIGAN, ASSIGNOR TO THE AMERICAN CAR AND FOUNDRY COMPANY, OF ST. LOUIS, MISSOURI.

CAR CONSTRUCTION.

SPECIFICATION forming part of Letters Patent No. 658,783, dated October 2, 1900.

Application filed February 26, 1900. Serial No. 6,534. (No model.)

*To all whom it may concern:*

Be it known that I, GEORGE I. KING, a citizen of the United States, residing at the city of Detroit, county of Wayne, State of Michigan, have invented a certain new and useful Improvement in Car Construction, of which the following is a full, clear, and exact description, such as will enable others skilled in the art to which it appertains to make and use the same, reference being had to the accompanying drawings, forming part of this specification, in which—

Figure 1:
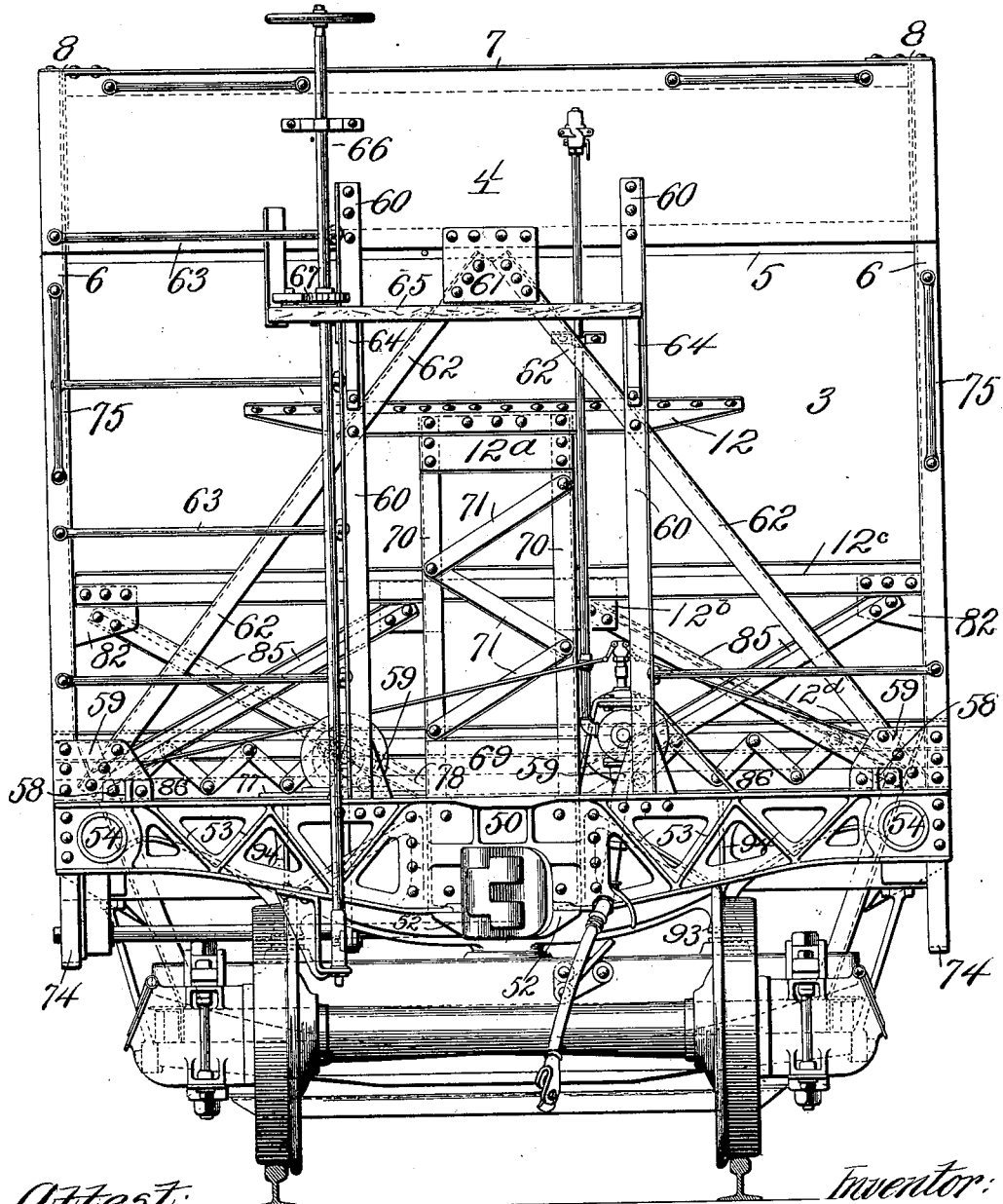
Figure 9:
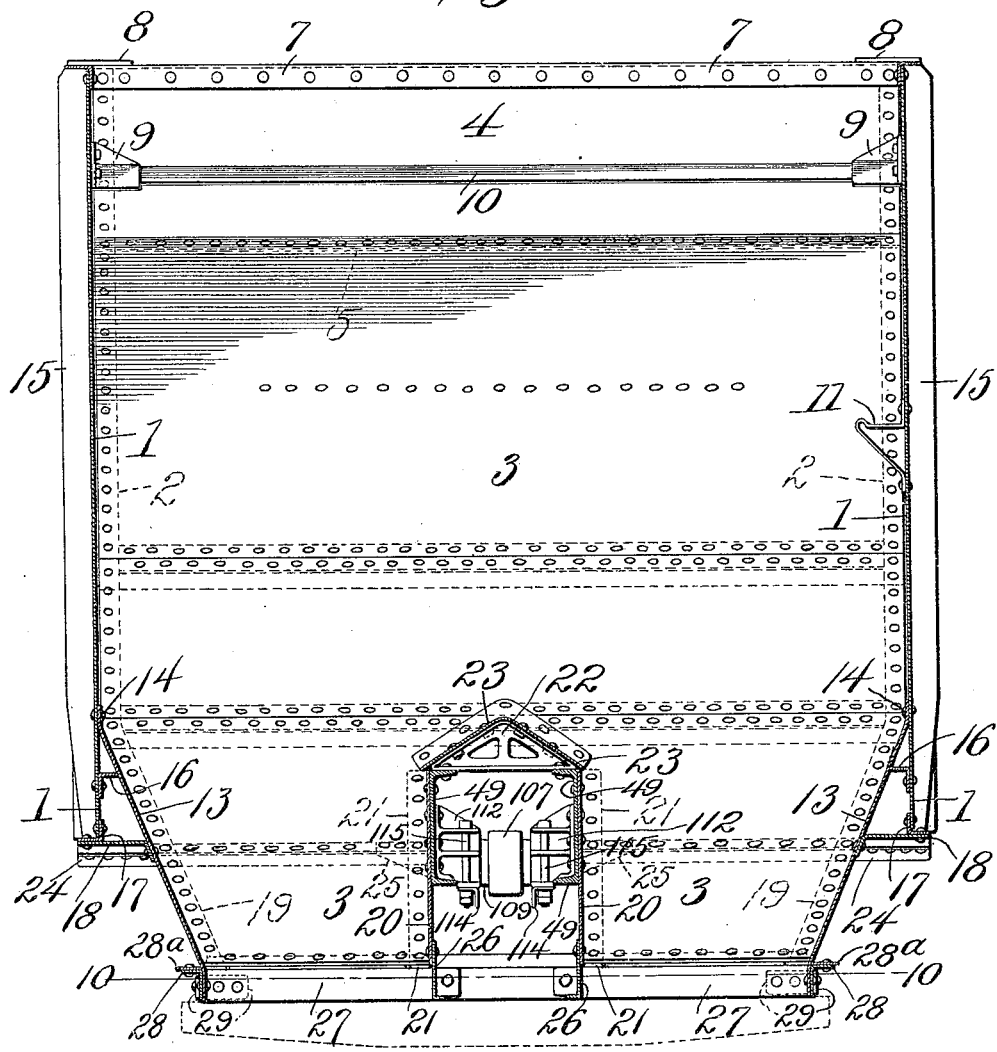
Figure 10:
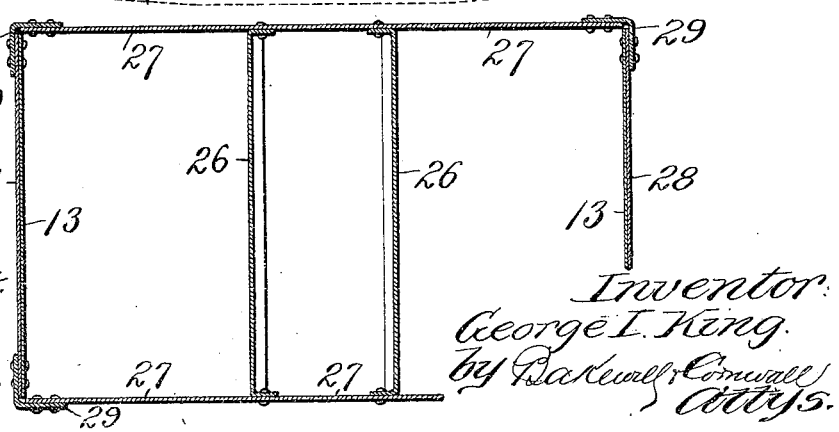

Figure 1 is an end elevational view of a hopper bottom car constructed in accordance with my invention. Fig. 2 is a side elevational view of one end of the car. Fig. 3 is a longitudinal vertical section through one end of the car. Fig. 4 is a top plan view of one end of the car. Fig. 4ª is a horizontal sectional view showing the manner of attaching the corner angle or post in position. Fig. 5 is a top plan view of the running-gear of one end of the car, the car-body being removed and the side sills omitted. Fig. 6 is a cross-sectional view through line 6 6, Fig. 2. Fig. 7 is a cross sectional view through line 7 7, Fig. 2. Fig. 8 is a cross-sectional view through line 8 8, Fig. 2. Fig. 9 is a cross-sectional view through the center of the car on line 9 9, Fig. 2. Fig. 10 is a cross-sectional view on line 10 10, Fig. 9. Fig. 11 is a side elevational view of the hopper-door-hanger mechanism. Fig. 12 is a cross-sectional view through the same. Fig. 13 is a top plan view of the same. Fig. 14 is a top plan view of a portion of the framing of the car, showing my improved bolster in position. Fig. 15 is a view showing the truck and car frame in section and the bolster in elevation. Fig. 16 is a front elevational view of the end sill.

This invention relates to a new and useful invention in car construction, the object being to construct a car wholly of metal, employing commercially-rolled forms and sheets or plates of metal, the structural car so built being designed to carry heavy loads with a minimum amount of dead-weight or material that enters into the construction of the car.

With this object in view the invention consists, generally stated, in making the side walls of the car of sheets or plates of metal which form plate-girders, said plate-girders in addition to carrying their proportion of the load also, as before indicated, serving as the containing side walls of the car. To resist the shearing forces at the ends of the plate-girder, and also to prevent said plates from buckling, I provide inclined stiffening-braces which slope downwardly and outwardly, preferably toward the points of support—to wit, the body-bolsters of the car—one or more pairs of said stiffening-braces at each end of the car being tied together by floor-beams, said floor-beams affording attachment to the floor-supports, which are disposed in such manner as to be subjected to direct stresses only. The car shown in the accompanying drawings is a hopper-bottom car, and the side walls are sheared off along the inclination of the floor-plates down to the side walls. I dispense entirely with the cross-ridge usually present in cars of this construction, whereby I am enabled to control the hopper-openings by two doors opening in opposite directions, said doors extending the entire width of the car.

The invention consists in the novel details, arrangement, and combination of the several parts, all as will hereinafter be described, and afterward pointed out in the claims.

*The car-body.*—In the drawings, 1 indicates the side plates of the car-body, which are preferably sheared to the proper shape, said plates having inwardly-extending flanges 2 at their inclined bottom edges, upon which the floor-plates 3 are supported and riveted.

4 indicates the end plates, whose lower edges are preferably flanged under the bottom plates, as at 5, and secured thereto by suitable rivets, said end plates extending laterally beyond the side plates and riveted to one member of a corner-angle 6, whose other member is riveted to the side plates 1, said corner-angle extending down to the frame of the car. Angle-rails 7 have their vertical members riveted to the upper edges of the side and end plates, while their horizontal members preferably extend outwardly over the sides and ends of the car, the corners of said rails being connected by connecting cover-plates 8, which are riveted thereto. Castings 9 are preferably arranged on the inner faces of the side plates at points intermediate the ends of the body, to which castings are secured tie rods or bars 10 for well-known purposes. Steps 11 are arranged along the inner face of one of the side plates for affording a foothold for the train-crew should their duties require them to walk over the car when the same is empty.

The bottom plates 3, before referred to, are sheared and so arranged that their joints extend transversely the car, said joints being preferably in the form of butt-joints. The contiguous edges of the plates are riveted to a member of the transversely-arranged angle or T bar $12^c$ on the under side of the bottom of the car. This angle-bar $12^c$ will hereinafter be termed a "floor-beam."

*The hopper.*—The hopper, which is arranged about the center of the car, has its end lines approximately on the same inclination as the bottom plates at the ends of the car, while the outer side walls of the hopper are formed by inclined hopper-plates 13, whose upper edges are riveted to the side plate 1 by a series of rivets 14.

15 indicates vertical strengthening-posts, preferably in the form of angle or T bars, which are arranged on the outer faces of the side plates about midway the length of the car and in line with the hopper-opening, of which posts there are preferably three in number on each side of the car. The length of these posts is coincident with the depth of the side plates 1 at this point, and intermediate the lower edges of the plates 1 and the points at which the hopper-plates 13 are connected therewith are arranged angle-bars 16, which extend horizontally. The vertical members of these angle-bars are secured by suitable rivets to the plates 1 and to the vertical posts 15, their horizontal members extending inwardly to brace the hopper-plates 13.

17 indicates angle-bars secured to the lower edge of the plates 1. These bars 17 have their vertical members secured to the lower edges of the plates 1 and to the flanges of the posts 15, while their horizontal members extend outwardly under the ends of said posts. To the horizontal members of these bars 17 are secured by suitable rivets plates 18, which extend inwardly and have their inner edges bent downwardly to coincide with the angle of the hopper-plates, to which they are riveted. The lower inclined edges of these hopper-plates are flanged inwardly, as at 19, under the floor-plates 3, which are secured to said flanges by suitable rivets.

The inner side plates 20 of the hopper are riveted to the beams forming the center sills of the car, which beams are preferably continuous throughout the length of the car. These inner side plates of the hopper are provided with flanges 21 along their inclined lower edges, which extend under the bottom plates 3 and are attached to said bottom plates by suitable rivets.

22 indicates a series of castings arranged on top of the center sills, which castings are preferably A-shaped, and support a hood-sheet 23, extending over the center sills and affording a shed to prevent the contents of the car from lodging on top of the center sill. The ends of this hood-sheet are preferably flanged up at an angle corresponding to the inclination of the bottom plates, to which said sheet is attached by suitable rivets.

In order to strengthen the bottom of the hopper and also tie the lower ends of the posts 15, I provide angle-irons 24, riveted to suitable castings 25, attached to the outer faces of the center sills, said angle-irons being riveted throughout their lengths to the bottom plates 3 and having their outer ends riveted to the bent-down flanges $18^a$ at the ends of the plates 18, which, as before stated, are riveted to the angle-bar 17. I prefer that the angle-bars 24 terminate at the center sills and be secured to castings attached to the center sills rather than have said angle-bars extend through openings in the center sills, although it is obvious that the angle-bars 24 can be continuous and serve their purpose fully as well as where they are interrupted.

*The hopper-openings.*—The flange at the lower edge of the side hopper-plates 13 is sheared and bent vertically opposite the door-opening or exit for the load. There are two of these exits, one on each side of the car or on each side of the center sills, and both of the hopper side plates 13 have the vertical flanges before referred to.

The hopper-plates 20, which are secured to the center sills, preferably have their flanges 21 cut away in line with the exits and a strip 26 riveted thereto, which strip has its lower edge bent inwardly. The vertical flanges on the hopper-plates 13 and the strips 26 form the side walls of the hopper-openings. The vertical end walls are formed by angle-plates 27, whose vertical members are coextensive in depth with the strips 26 and the vertical flanges of the hopper-plates 13, while the angle members of these plates 27 are attached to the bottom plates 3 by suitable rivets, filling-plates being employed between the flanges 14 and 21 of the side hopper-plates 13 and 20, respectively, for well-known purposes. The vertical members of the strips 26 are bent at their ends and secured to the angle-plates 27, as shown in Fig. 10.

28 indicates angle-irons, secured to the vertical flanges of the side hopper-plates 13 for the purpose of strengthening the same, while the angle end plates 27 are strengthened by straps 29, bearing against the outer faces of the vertical members thereof and to which they may be riveted, if desired, while the ends of said straps bend inwardly around the angle-bars 28, to which they are riveted.

From the above it will be noted that the hopper-bottom of the car-body leads to exit-openings for the load on each side of the center sills, and that said exit-openings are surrounded by vertical walls, which are so strengthened that the bottom of the car at this point is made most rigid. The only purpose of the flanged plates 26, forming the lower edges of the inner vertical walls of the hopper, is to prevent the contents of the loaded car from jolting through the space which might be left beneath the inner hopper-plates 20 and the hopper-door. Even should the contents of the car pass through such a space it would not be a serious objection, as the doors would be in position and the angle-plates 27 would prevent the material from falling.

*The hopper-doors.*—The doors for closing the exit for the load consists of transversely-disposed angle-beams 30, which are braced by suitable castings 31, which castings have a plate 32 riveted thereon, said plate forming the panel of the door proper. There are two such doors provided, which doors are designed to be swung in opposite direction in their opening and closing movements. The angle-bar 30 at the outer edge of each door has its horizontal flange turned outwardly, and secured to this angle-bar are castings 33, preferably located at equal distances from the center of the door, to which castings is pivoted the spread ends of a Y-shaped link 34, the opposite end of said link being pivotally connected to a rock-arm 35, extending from the inner end of a rock-shaft 36, mounted in suitable bearings secured to the center sills and to the side sills of the car-frame. The outer end of rock-shaft 36 carries a ratchet-wheel 37, with which coöperate pawls 38, mounted on suitable supports depending from the side sills of the car. Rock-shaft 36, beyond the ratchet-wheel 37, is squared for the reception of a removable wrench or handle, which is employed to rock said shaft to open or close the door.

39 represents a stop-block secured to the center sill and in the path of the rock-arm 35, so that when the door is closed said rock-arm bears against said block. The pawls engaging on each side of the ratchet-wheel and held in position by gravity will tend to prevent the shaft 36 from moving in either direction, but to relieve these pawls of all strain the rock-arm 35 is designed to move slightly past a position of dead-center with respect to the link 34 when the door is closed, so that the weight of the door, which tends to move outwardly at all times from its closed position, to which may be added the weight of the load in the car on the door having a similar tendency, will force the rock-arm 35 more firmly against its stop-block 29.

Mechanism as above described is employed for each door, so that the doors may be moved independently of each other.

40 indicates castings, to which are pivoted the hangers for suspending the doors, said castings being preferably secured to the under sides of the strengthening-plates 18 or any other suitable support. In the construction shown in Figs. 1 to 10 two hanger-arms 41 and 42 are pivotally connected to each casting, said hanger-arms extending down and being pivotally received upon stud projections extending laterally from castings of the door-frame. By this construction the door is held flat against the lower edges of the vertical walls of the hopper-opening, the hanger-arms being obliquely disposed when the door is in its closed position, so that the weight of the door and its superimposed load has a tendency to cause said door to move outwardly a short distance in its opening movement, which is resisted, as before stated, by the dead-central position of the rock-arm 35 and link 36. Hangers 41 and 42 are of unequal lengths and are pivoted at separate points to their fixed supports (castings 40) and to the side edges of the door. There are four of these hangers to each door, and hangers 41, which are connected to the inner edge of the door, being the longer, will cause said inner edge of the door to move in a path or arc described from a center and having a greater radius than the path of movement of the rear edge of the door, so that when said door is in its open position it will be inclined or tilted, so that any material which might have lodged on the door in its opening movement will roll off, due to the inclination of the door in its open position.

In Figs. 11 to 13 I have shown a door-suspending mechanism which may be desirable to use in some instances, wherein the inner edge of the door is supported by a single link 43, having a fixed pivotal point for the attachment of its upper end, while its lower end is pivotally connected to the door. The casting 44, secured to the bottom plates of the body, or some other suitable support is provided with a slot or groove 45 in its lower edge for receiving a roller 46 at the rear edge of the door. The way formed by the slot or groove 45 is preferably curved upwardly and serves to guide the outer edge of the door in its opening movement, so that the same will be elevated above the inner edge when the door is in its open position, and thus an inclination is given to the door in order that it may shed any material which would attempt to lodge thereon.

Each door is provided with a single roller 46 at each side of its rear edge, and there are two castings 44, having corresponding guideways for the rollers of a single door. The operating mechanism for a door provided with rollers 46, running in guideways, may be the same as that heretofore described.

It is obvious that while I have described the frames 44, which contain the guideways or grooves, as "castings," such frames can be formed of pressed or shaped rolled metal. Furthermore, it is also obvious that instead of supporting the inner edge of the door by hangers said inner edge of the door can be provided with laterally-projecting rollers fitting in grooves or ways in the frames 44, which would necessarily, in this construction, be extended inwardly a sufficient distance to provide said grooves or ways for the front rollers of the door.

In order to guide the doors in their opening and closing movements, I prefer to attach plates 28ᵃ on the angle-irons 28, which stiffen the vertical flanges of the hopper-plates 13. These plates 28ᵃ preferably extend laterally beyond the angle-plates 28; but of course these plates can be dispensed with if the horizontal member of the angle-bar 28 extended outwardly a sufficient distance to coöperate with the door-hangers.

*The frame.*—I have termed that portion of the construction which comprises the side and center sills and their associate parts, which carry their proportion of the load, as the "frame." I will now describe the construction of the side sills.

*The side sills.*—I have hereinbefore, in connection with my description of the hopper of the car, referred to two oppositely-arranged angle-bars 16 and 17. These bars are arranged parallel to each other and are secured to the lower edges of the side plates 1 of the body of the car, the inwardly-turned angle-bar 16 bracing the hopper-plates 13 and the outwardly-turned angle-bar 17 bracing the lower edges of the plates 1. These angle-bars 16 and 17 form the main members of the side sills, and from an examination of Fig. 9 it will readily be understood that instead of having two parallel angle-bars arranged with their horizontal flanges oppositely disposed a single Z-shaped bar can be employed, or, for that matter, any well-known cross-section of commercially-rolled forms can be used. However, I have shown oppositely-disposed angle-bars 16 and 17 in the drawings, and will state that these bars preferably continue to the ends of the car, they being latticed, as at 47, to give them strength and, at the same time, save weight at their ends beyond the points where they receive the side plates 1 of the car-body. Connection-plates 48 are arranged at the ends of the side sills, to which plates and to the side sills are riveted the angle corner-posts 6.

*The center or draft sills.*—The center or draft sills have two main members in the form of channel-beams 49, arranged parallel to each other, their flanges being turned inwardly. These center or draft sills extend throughout the length of the car.

*The end sills.*—50 indicates the end sill, which is preferably formed of a single casting having a deep central portion and provided with an opening 51 for the passage of the shank of a coupler, while a bar or angle-plate 52, bolted to the lower side of the end sill, forms one wall (the lower) of the opening 51 and serves the purpose of a carry-arm. Horizontally-disposed flanges extend outwardly from the upper and lower edges of the end sill, and, if desired, the vertical web of the end sill may be cut away for the purpose of lightening the same, leaving angle-braces 53, stiffened by obliquely-arranged ribs, whose function is to equally distribute the strain throughout the end sill. The coupler-pocket is braced by suitable webs and flanges to give it strength, and both the upper and lower outwardly-extending horizontal flanges preferably recede at their ends. Pole-pockets 54 are preferably provided at the ends of the end sill for well-understood reasons.

*End supports and bracing.*—Rearwardly-extending projections 55 project from the ends of the end sill, to which are riveted horizontal corner connection-plates 56, said connection-plates being likewise riveted on top of the angle-bars 16 of the side sill. The corner-posts 6, which are riveted to the vertical side corner connection-plates 48 of the side sills, are also riveted to the extreme ends of the end sill, this method of attaching the parts together making a very rigid construction.

For the sake of convenience I will designate the connection-plates 48 as the "vertical side corner" connection-plates and the connection-plates 56 as the "horizontal corner" connection-plates. The center or draft sills are connected to the end sills by suitable connection-angles 57, riveted to both of said parts, one of said angle connections being arranged on each side of the vertical web of each channel-beam sill.

58 indicates upwardly-extending vertical projections flush with the inner face of the end sill and strengthened by suitable ribs, to which projections are secured by suitable rivets or otherwise vertical connection-plates 59, which for the sake of distinction I will term "intermediate vertical" connection-plates.

60 indicates angle-posts riveted at their upper ends to the end plates 4 of the car-body and at their lower ends to the intermediate vertical connection-plates 59. These posts 60 are preferably vertically disposed.

61 indicates a connection-plate depending from about the center of the end plate 4 of the car-body, to which it is riveted, and diagonal braces 62 are riveted to this plate 61 and to the outer vertical connection-plates 59. Rivets are preferably passed through the posts 60 and the diagonal braces 62 at their points of intersection. The corner-posts 6 and the intermediate posts 60 may be further strengthened by the attachment of the handholds or rods 63 thereto, which handholds are for the use of the train-crew in climbing to or descending from the top of the car.

Knees 64 may be secured to the intermediate posts 60 for supporting a platform 65, on which a brakeman may stand in order to operate the hand-brake mechanism, of which 66 indicates the staff, having a hand-wheel at its upper end, said staff being mounted in a bearing riveted to the end plate 4 and carrying the usual ratchet-wheel 67, arranged above the platform 65, with which ratchet-wheel coöperates the usual dog. The lower end of this brake-staff has a stepped bearing in a bracket bolted or otherwise secured to the end sill.

Diagonal braces in the form of angle-bars 68 are riveted to the horizontal corner connection-plates 56 and to a cover-plate for the body-transom hereinafter described.

69 indicates an angle connection-plate whose horizontal member is riveted to the upper flanges of the center sills and whose angle member is preferably at an inclination at right angles to the inclination of the bottom of the car. Secured to the angle member of this plate 69 and to a batten-plate $12^a$, attached to the depending flange of an angle or T bar 12 by suitable rivets, are two parallel angle-bars 70, which are preferably cross-braced by lattice-work 71, this construction, comprising the latticed angle-bars 70, being arranged at right angles to the inclination of the bottom of the car and serves to support the weight of the load carried by the car-body at this point.

72 indicates angle-bars riveted to the side plates 1 and to the vertical connection-plates 48 and arranged at right angles to the inclination of the bottom of the car for bracing the corner of the frame. These bars 72 and the corner-posts 6 may be braced with respect to each other by the use of a handhold or rod 73, riveted to said parts. This rod is designed to be grasped by a person getting on or off the car, a stirrup or sill-step 74, depended from and being riveted to the end of the side sill, serving as a foot-rest, while a vertical handhold or rod 75 near the upper end of the post 6 is designed to be grasped by a person to steady himself while standing on the end sill.

*Brake mechanism.*—In the drawings I have shown the usual brake mechanism as commonly employed at present, wherein the brake-cylinder, auxiliary reservoir, triple valve, &c., are mounted above the framing of the car instead of underneath the framing, as is usual. The piston-rod of the brake-cylinder connects with the brake-lever, having a fulcrum in a bracket 76, mounted on one of the end posts 60, the lower end of said lever being connected to the usual brake-rod, said rod also having the usual chain designed to be wound upon the lower end of the brake-staff 66 when the brakes are applied by hand. This brake system and the arrangement of the brakes, as stated before, are common to cars in general use and are well understood. They form no part of my present invention.

*Diagonal bracing.*—As a hopper-bottom car is provided with overhanging ends or ends which are elevated above the framework proper, it is desirable to stiffen this framework to resist torsional and twisting strains in switching and when poles are used. I therefore provide diagonal brace-bars 68, (see Fig. 5,) which are riveted to the cover-plate 77 of the body-bolster and to the horizontal corner connection-plate 56. By this construction when a pole is used to move the car the brace-bars 68 are subjected to direct stresses only, distributing the strain throughout the underframing, thus relieving the end and side sills and the connections between said parts.

*Inclined stiffening-braces and floor-supports.*—The cover-plate 77 of the body-transom carries an angle connection-plate 78, which reinforces said cover-plate and affords means of attachment for the inclined floor-supports 79. These floor-supports are attached at their upper ends to a connection-plate $12^b$, depending from the flange of the floor-beam $12^c$.

80 indicates vertical connection-plates riveted to the outer faces of the side sills, on the outer faces of which connection-plates 80 are secured twin brace-bars 81, which extend upwardly substantially at right angles to the plane of the bottom plate of the car-body and are riveted to the side plate 1 of the car-body, one or both of these twin brace-bars extending to the upper edge of the car-body for the purpose of strengthening the same at this point. These "twin brace-bars" 81, as I have termed them, form inclined stiffening-braces, which slope downwardly and outwardly, being connected to the underframing at points coincident with the body-transom. By being attached directly to the side plates these bars 81 resist the shearing forces in the side wall, which side wall is substantially a plate-girder, in addition to which said inclined stiffening-braces prevent the side walls from buckling outwardly under load. The outwardly-extending flanges of these twin braces are arranged next each other, and between them are secured connection-plates 82, said connection-plates being also secured to the depending flange of the floor-beam $12^c$. By this construction it will be noted that this floor-beam is attached directly to the floor-plates and, through the medium of the connection plates 82, to the inclined stiffening-braces, whereby said floor-beam ties said stiffening-brace against lateral movement in addition to supporting the floor-plate the entire width of the car at this point. Angle connection-plates 83 extend from the inner faces of the plate 80. Connection-plates $12^b$ are riveted to the upper ends of the angle-braces 79 and to the depending flange of the floor-beam $12^c$.

85 indicates diagonal braces extending from connection-plates 82 to the angle-plate 78 and from the connection-plates 83 to connection-plates $12^b$, to which plates said diagonal braces are riveted respectively, a rivet also being preferably introduced through the diagonal braces at their points of intersection.

86 indicates an angle-plate extending transversely the car-framing, being secured to the side and center sills by suitable rivets, the angle member thereof being in line with the depending flange of a floor-beam $12^d$, which is secured to the bottom of the car and whose ends project laterally beyond the side walls of the car. This floor-beam 12ᵈ and the angle 86 are strengthened by lattice-work 87, and, further, they extend laterally beyond the side edges of the car-body and beyond the upper faces of the side sills, to which they are connected, respectively, such projecting ends being riveted to the outwardly-projecting member of an angle-brace 88, arranged at right angles to the plane of the bottom plate 3 and extending to the upper edge of the plate 1 of the car-body for strengthening the car at this point. This brace 88 is connected at its lower end to a plate 89, riveted to the side sill. These braces 88, one of such braces being on each side of the car, form inclined stiffeners and are introduced at the points shown in the drawings for similar purposes, as hereinbefore described with relation to the inclined stiffening-braces 81. However, as the stiffening-braces 81 are subjected to a greater strain than are the braces 88 I prefer, as before described, to arrange the braces 81 in pairs, or the same desired result would be produced if a single brace 81 were used on each side of the car and the cross-section of the angle increased.

The construction above described, involving transversely-arranged floor-beams, the floor-supports, and the inclined stiffening-braces, to which the floor-beams are connected when used in a hopper-bottom car, has many advantages over all constructions of hopper-bottom cars or other types of cars with which I am familiar. Among these advantages may be mentioned the fact that the side wall of the hopper-bottom car shown in the accompanying drawings is in the form of a plate-girder and will be stiffened by the inclined stiffening-braces not only to resist the bulging tendency of the side plates, where loose loads are carried, but said inclined stiffening-braces being arranged substantially at right angles to the inclination of floor-plates of the car and sloping downwardly and outwardly toward the supporting bolsters will resist the shearing forces in the side plates. These inclined stiffening-braces, in addition to preventing the side plates from crimping or buckling under the action of the shearing forces in the side plates above referred to, also coöperate with the floor-supports to sustain the floor-load at the ends of the car in line with the direction the floor tends to deflect under load. These floor-supports by being inclined substantially at right angles to the inclination of the bottom plates of the car are subjected to direct stresses only.

The floor-supports in coöperating with the inclined stiffening-braces make a most rigid structure under the overhanging ends of the car-body and prevent distortion of said body with respect to the frame and materially assist in resisting torsional or twisting strains to which the body and frame are subjected in rounding curves or making switches. These floor-supports, in addition to supporting the floor loads, also tie the inclined stiffening-braces, and by the use of diagonal or crossed braces in the floor-supports the load is distributed equally over the supporting-bolsters.

I am aware that heretofore cars have been made wherein the side walls consist of plates of metal, which side walls help to carry the load, they being stiffened by top and bottom angles, termed "chords," and vertical posts, said posts and angles being secured directly to the side walls of the car. In my construction it will be seen that the vertical posts 15, located about midway the length of the car, answer substantially the same purpose as the vertical posts just referred to in that they stiffen the side plates to prevent bulging, and in addition to this in my construction these vertical posts coöperate in this sense with the inclined stiffening-braces. I am also aware that cars have been constructed with trussed sides, said trussing consisting of upper and lower chords connected by vertical posts and braced by diagonals; but in such a construction the containing-walls of the car are in the form of wooden planks arranged longitudinally, which are in no sense subjected to the strain of a plate-girder, nor indeed can such a construction be said to resemble in any respect a plate-girder. Depending upon the inclination of these diagonals, they are subjected to compression and tensile strains. The inclined stiffening-braces shown in the accompanying drawings cannot be considered equivalent in any respect to the diagonals of a trussed structure in that my inclined stiffening-braces are not connected at their ends to vertical posts and are not subjected to tensile strains. On the contrary, they are secured directly to the girder-plates forming the side walls of the car and resist the shearing forces in said plates besides stiffening the plates against lateral bulging. In tying the inclined stiffening-braces by the floor-beams and providing floor-supports directly under and attached to said beams substantially throughout the width of the car I have produced a structure which is new, so far as I am aware, and I wish to be understood as broadly claiming this feature of my invention. The tendency in the side plates to bulge laterally is induced, primarily, by the vertical load carried by said plates, and where such a load is "fixed" in contradistinction to "loose" the tendency is not so great; but where the loads are loose, as when coal is carried by cars, the lateral pressure of the loose load against the side walls aggravates the tendency of said side walls to bulge, which tendency, as stated before, is resisted and its effect on the side plates neutralized by the presence of the inclined stiffening-braces.

It will also be noticed, in connection with the side plates of the car-body, that they are cut or sheared away the entire length of the inclined portions, and thus the triangle of material which is usually left where the plates meet the side sills is saved.

The plate-girder sides are relied upon to carry their proportion (about seventy per cent.) of the entire load, the center sills and body-bolsters taking the remainder. The stiffening-braces secured to the sides of the plate-girders support the floor-beams, which carry the floors, and thus a large portion of the load on the floor-plates is communicated to and carried by the plate-girders. The floor-supports, which extend to the body-bolster, in connection with the side and center sills, are the main elements of a compound truss supporting the car-body. Thus the bolster is tied in place—that is, prevented from being displaced outwardly and longitudinally—by the side and center sills, which are in tension (so long as the car is not subjected to buffing strains) as elements of these compound trusses. The floor-supports attached to the body-bolster and to the inclined stiffening-braces 81 below the floor-line are subjected to direct stresses only, and with respect to continuing the side sills throughout the length of the car it is only necessary that said sills be secured to the lower edges of the side plates to prevent the bolsters from spreading apart, as said side sills may be entirely dispensed with, say, between the post 15. However, I have shown the side sills as continuous, and thus they may conveniently be attached to the deepest portions of the plate-girders, forming tension-flanges therefor. Being composed of oppositely-arranged angles 16 and 17, it will be seen that compound tension-flanges are thus provided for the plate-girders. The inclined stiffening-braces 88 extend below the floor-line for the purpose of carrying floor-beams, which extend transversely the car, supporting the floor-plates and center sills at this point. These floor-beams are directly connected to the side and center sills through the lattice-work, and in order to hold the side sills in place laterally the stiffening-braces are extended downward and attached thereto, but for vertically loading only they need not be. By referring to Fig. 8 it will be seen that angles $x$ are attached to this floor-beam and extend downwardly on each side of the center sills 49, whereby said center sills are supported and held in their designed position, they being much more subject to deflection than the side girders under vertical loads. The angles $x$ are employed to enable the use of a greater number of more efficient rivets than could be placed through the angle 86 and the upper flanges of the center sills 49, and thus a more rigid structure results. I do not herein claim these reinforcing-angles, as the same are shown, described, and claimed in an application filed by me August 17, 1900, serially numbered 27,163.

*The body transom or bolster.*—The bolster is shown in detail in Figs. 14 and 15, wherein it will be seen to consist of a casting made deepest at its middle portion and strengthened to best take care of the strain to which it is subjected. The cover-plate 77, to which I have before referred, serves as a tension member for this bolster, said cover-plate tension member being considerably strengthened by the angle-plate 78, to which the brace-posts 79 are connected. The bolster as an entirety observes a general cross-section of I-beam form, and its distinguishing characteristics are that a squared recess 90, open at its top, is provided about the center of the bolster, and against the flanges forming the side walls of said recess are received and secured by suitable rivets the channel-beams 49, forming the main members of the center sills. The usual center bearing 91 is provided on the lower face of the bolster, while the structure above this center bearing and between the beams 49 is strengthened by a bulge or crown 92, which also forms abutting-shoulders, against which rest the lower flanges of the beams 49.

93 indicates the side bearings, formed integral with the bolster and which, as usual, are located directly above the side bearings of the truck-bolster. The central web of my improved bolster is cut away at convenient places for the purpose of lightening the same, and strengthening-ribs are provided at convenient points where the middle web is left for well-known purposes. I have arranged these ribs vertical, as at 94, immediately above the side bearings to strengthen the structure at this point, while diagonal ribs 95 extend from the junction of the flanges at the upper corners of the middle pocket to the junction of the vertical ribs 94 and the bottom lateral flange of the bolster. The vertical web of the bolster is preferably extended beyond its bottom flange for the purpose of strengthening the same. The ends of the bolster are broadened and formed with elongated vertical walls 96, which are shaped to snugly receive the angle-bars 16 and 17, forming the side sills, which are riveted thereto. The horizontal flanges of the bar 17 are further supported by the horizontal shelf-like projections 97, extending from the ends of the bolster therebeneath. These projections 97 are strengthened by vertical flanges 98, the same being continuations of the central vertical web of the bolster.

I do not make any claims upon the details of construction of the body transom or bolster just described in this application, as the same is shown, described, and claimed in a divisional application (Case A) filed by me on or about May 7, 1900, Serial No. 15,813.

*The truck.*—The truck shown in the drawings is, with the exception of the spring-plank, of well-known construction and consists of the usual parts, such as are commonly employed in devices of this character.

I do not make any claims upon the details of construction of the car-truck just described in this application, as the same is shown, described, and claimed in a divisional application (Case C) filed by me on or about May 7, 1900, Serial No. 15,815.

*The draft-rigging.*—The coupler-shank, as before described, passes through the opening 51 in the end sill and is supported by the angle-plate 52, forming the carry-arm. The rear end of the coupler is provided with the usual yoke 107, through which passes the front and rear follower-plates 108 and 109, respectively. Instead of having a tail-bolt and a single set of draft-springs encircling said tail-bolt I prefer to arrange projections in line with each other and extending from the inner faces of the front and back follower-plates for supporting two sets of draft-springs 111. These draft-springs are further held in place by castings 112, bolted or riveted to the draft-sills and extending toward each other and partially embracing the draft-springs. Vertical flanges are provided in the castings 112 in front of and behind the front and back follower-plates to serve as abutments or shoulders for said follower-plates. It is obvious that a cross-key (not shown) can pass through the rear end of the coupler-shank, to which cross-key could be connected the rods of the well-understood "continuous" draft-rigging.

I do not make any claims upon the details of construction of the draft-rigging just described in this application, as the same is shown, described, and claimed in a divisional application (Case D) filed by me on or about May 7, 1900, Serial No. 15,816.

While I have shown in the drawings specific forms of commercially-rolled bars, it is obvious that commercially-rolled forms having a cross-section different from those shown and described can be employed in many instances in lieu of the particular cross-sections shown. Furthermore, it will be obvious that where I have shown lattice-work riveted to the members of parallel commercial shapes in lieu thereof forms can be employed where the webs would be continuous and integral with the flanges, thus dispensing with the use of lattice-work. These different forms of angle-bars are so well known that I have not deemed it necessary to illustrate the same in the drawings. It will also be noted that instead of flanging the plates forming the side and end plates of the car-body and the side hopper-walls under the bottom-plates an obvious substitution for this construction would be to flange the side edges of the bottom plates and secure same by rivets to their associate plates. Where the bottom plates are flanged, it may be desirable, though not necessary, to have the joint or joints in said bottom plates extend longitudinally instead of transversely the car. This joint can easily be made by the employment of the well-known cover-plates and the use of filling-plates where necessary.

The accompanying drawings illustrate a hopper-bottom car, having a capacity of one hundred thousand pounds, and the cars I have built in accordance with the plans exhibited in the accompanying drawings are very rigid and strong and stand up well in service.

Having thus described my invention, what I claim, and desire to secure by Letters Patent, is—

1. The combination with the side plates 1 having inwardly-extending flanges 2 at their lower edges, of the floor-plates 3 resting upon, and secured to, said internal flanges, and the end plates 4 whose lower edges are flanged under the bottom or floor plates, said parts being secured together with suitable rivets; substantially as described.

2. In a car, the combination with the side plates 1, of the floor-plates, end plates extending laterally beyond the side plates, and corner angles riveted to the side plates and the projecting ends of the end plates; substantially as described.

3. The combination with the side plates whose lower edges are flanged inwardly, of floor-plates resting upon, and riveted to, said flanges, the contiguous edges of said floor-plates abutting against each other, said butt-joints extending transversely the car, and transversely-arranged angle or T bars on the under side of the bottom of the car, to one member of which the contiguous edges of said floor-plates are riveted; substantially as described.

4. The combination with the side plates 1, of floor-plates, and obliquely-arranged hopper-plates 13 whose upper edges are riveted to the side plates, and whose lower edges are flanged under the bottom plates; substantially as described.

5. The combination with a side plate 1, of an obliquely-arranged hopper-plate 13 riveted thereto at a point above the lower edge of the side plate, and an angle-bar 16 secured to the inner face of the side plate and having its horizontal member extending inwardly to brace the hopper-plate; substantially as described.

6. The combination with a side plate 1, of an obliquely-arranged hopper-plate 13 riveted thereto at a point above the lower edge of the side plate, an angle-bar 16 secured to the inner face of the side plate and having its horizontal member extending inwardly to brace the hopper-plate, an angle-bar 17 secured to the lower edge of the side plate, and vertical posts 15 arranged on the outer side of the side plate; substantially as described.

7. The combination with a side plate, of a side sill formed with an inwardly-turned flange at its upper edge, and an outwardly-turned flange at its lower edge, of a hopper-plate secured to the inner face of the side plate at a point above said side sill, so that said hopper-plate is strengthened by the inwardly-extending flange of the side sill, a post or posts arranged on the outer face of the side plate, and a strengthening-plate 18 secured to the lower flange of the side sill and extending inwardly and secured to the hopper-plate 13; substantially as described.

8. The combination with a side plate, of a side sill formed with an inwardly-turned flange at its upper edge and a flange at its lower edge, of an inclined hopper-plate secured to the inner face of the side plate at a point above said side sill, said hopper-plate being supported by the inwardly-extending flange of the side sill, and a strengthening-plate 18 secured to the lower flange of the side sill and extending inwardly, its inner edge being secured to the inclined hopper-plate; substantially as described.

9. The combination with the side plates of a car whose ends are cut away, of inclined floor-plates, continuous floor-beams which extend laterally beyond the side plates, and inclined stiffening-braces to which the projecting ends of the floor-beams are secured; substantially as described.

10. In a hopper-bottom car, the combination with the under frame in which are included side sills, of an inclined floor, side walls, a plurality of transversely-arranged floor-beams arranged under the inclined floor and above the plane of the side sills, and a plurality of inclined stiffening-braces extending from the upper edges of the side walls to the side sills, and to which the floor-beams are respectively secured; substantially as described.

11. The combination with a side plate, of an inclined hopper-plate riveted to said plate above its lower edge, a side sill arranged at the lower edge of the side plate, and a stiffening-plate riveted to the side sill and to the inclined hopper-plate; substantially as described.

12. The combination with the center sills, of plates 20 secured thereto and forming the inner side plates of the hopper, said plates being provided with flanges at their lower edges, and bottom plates which rest upon, and are secured to, said flanges; substantially as described.

13. The combination with the center sills, of plates 20 secured thereto and forming the inner side plates of the hopper, said plates being provided with flanges on their lower edges, bottom plates which rest upon, and are secured to, said flanges, and inclined plates 13 forming the outer side walls of the hopper which are also provided with inturned flanges at their lower edges which extend under, and are riveted to, the bottom plates; substantially as described.

14. The combination with the center sills which pass through the deepest portion of a hopper-bottom car, of A-shaped castings secured to said center sills within the car, a hood-sheet 23 secured to said castings and extending over the center sills to shed the contents of the car, inclined bottom plates through which the center sills pass, the ends of the hood-sheet being flanged to correspond with the inclination of the bottom plates, and suitable rivets passing through said hood-sheet flanges for securing the same to the bottom plates; substantially as described.

15. The combination with the side plates, of inclined bottom plates, transversely-arranged angle tie-bars secured to the center sills and to the under sides of the side sills, rivets for connecting the floor-plates with said angle tie-bars, and hopper-strengthening plates 18 to which the outer ends of said angle tie-bars are connected; substantially as described.

16. The combination with the side plates, of the inclined bottom plates, inclined hopper-plates secured to the side plates, center sills, side sills, strengthening-plates riveted to the side sills and to the inclined hopper-plates, the ends of said strengthening-plates being bent at an angle, and angle-irons 24 riveted to the bottom plates 3 and the bent ends of the strengthening-plates; substantially as described.

17. The combination with the side plates, of the inclined bottom plates, inclined hopper-plates secured to the side plates, center sills, side sills, strengthening-plates riveted to the side sills and to the inclined hopper-plates, the ends of said strengthening-plates being bent at an angle, angle-irons 24 riveted to the bottom plates 3 and the bent ends of the strengthening-plates, and castings attached to the outer face of the center sills to which said angle-irons are secured; substantially as described.

18. The combination with the side plates, of the inclined bottom plates, the inclined hopper-plates secured to the side plates and having an inturned flange at its lower edge extending under the bottom plate, said flange being bent vertically opposite the hopper-opening; substantially as described.

19. The combination with the hopper-plate 13 provided with a vertical flange to form one of the side walls of the hopper-opening, of inclined bottom plates 3, the hopper-plates 20, and a strip 26 formed with a flange at its lower edge; substantially as described.

20. The combination with the hopper-plate 13 provided with a vertical flange to form one of the side walls of the hopper-opening, of inclined bottom plates 3, the hopper-plates 20, angle-plates 27 whose vertical members are coextensive in depth with the vertical flanges of the hopper-plates 13, and rivets for securing the angle members of these plates 27 to the bottom plates 3; substantially as described.

21. The combination with the inclined bottom plates of the hopper-plates 13 and 20 provided with flanges on their lower edges to support the bottom plates, the flange of the plate 13 opposite the hopper-opening being bent vertically, a strip 26 secured to the lower edge of the plate 20, and angle-plates 27 secured to the ends of the bottom plates; substantially as described.

22. The combination with an inclined bottom plate, of a side hopper-plate 13 riveted thereto, said hopper-plate having a vertical flange opposite the hopper-opening, and an angle-bar 28 secured to the outer face of the vertical flange of the side hopper-plate 13; substantially as described.

23. The combination with the bottom plates and the side hopper-plate 13, of the angle-plates 27, the angle-bars 28, and corner-straps 29 for strengthening the plates 27, said straps being riveted to the angle-bars 28; substantially as described.

24. The combination with the angle-beams 30, of the hopper-door, of castings 31 secured to said angle-beams for bracing the same, and a plate 32 riveted on said castings and beams, said plate forming a panel of the door proper; substantially as described.

25. The combination with a hopper-bottom car, the walls of whose hopper-opening are vertically disposed, of a door for closing said opening, means for guiding said door in its opening and closing movements whereby, when said door is closed, it is on a horizontal plane, and when open, is inclined or tilted to one side of the hopper-opening, a rock-shaft mounted on the car, a rock-arm on said shaft, a link connection between said arm and said door, and a stop-block in the path of the rock-arm, with which said rock-arm coöperates when the door is closed; substantially as described.

26. The combination with a hopper-bottom car, the walls of whose hopper-opening are vertically disposed, of oppositely-opening doors for bearing against the lower edges of said vertical walls inclosing said opening, hangers for suspending said doors, mechanism for operating said doors independently of each other, said mechanism comprising links and rock-arms, and stop-blocks in the paths of the rock-arms for coöperating with said rock-arms when the doors are closed and the rock-arms and links move past a dead-central position with respect to each other; substantially as described.

27. In a hopper-bottom car, the combination with a door for closing the exit for the load, of stationary frames arranged on each side of the door and formed with guideways, rollers on the door fitting in the guideways of the frame, and mechanism for opening and closing said door; substantially as described.

28. The combination with a hopper-bottom car provided with vertical walls around its hopper-opening, of frames arranged on each side of the car and formed with guideways, a door for closing the hopper-opening, rollers on said door which fit in said guideways whereby, when the door is closed it bears against the vertical wall forming the hopper-opening, and when said door is open, it is inclined or tilted, and mechanism for moving said door, said mechanism comprising a link having one end pivotally connected to the door and its other end to the rock-arm, a rock-shaft on which said arm is mounted, means for locking said shaft against movement, and a stop-block in the path of the link for determining a position past dead-center, whereby said link in its dead-central position serves to lock the closed door; substantially as described.

29. The combination with a hopper-bottom car provided with vertical walls around its hopper-opening, of a door for closing said hopper-opening, hangers arranged at each side of the door for pivotally supporting the front edge thereof, laterally-projecting rollers at the rear edge of the door, and frames on each side of the door formed with guideways for receiving said rollers and guiding the rear edge of the door in its opening-and-closing movement; substantially as described.

30. The combination with a hopper-bottom car, of side sills extending the length thereof, said sills comprising oppositely-arranged angle-bars 16 and 17, the side plates of the car forming the webs of the sills, respectively, at the center of the car, and latticework between said bars at the ends of the car; substantially as described.

31. In a hopper-bottom car, the combination with channel-iron center sills whose flanges are presented inwardly, of hopper-sheets which are secured to the backs of the vertical webs of the channels, said channels offering a solid, uninterrupted bearing of considerable area to said hopper-sheets; substantially as described.

32. The herein-described end sill comprising a casting having a deep central portion, horizontally-disposed flanges extending outwardly from the upper and lower edges thereof, angle-braces 53 stiffened by obliquely-arranged ribs formed integral with the end sill, said upper and lower outwardly-extending flanges receding toward the ends of said end sill; substantially as described.

33. The herein-described end sill comprising a single casting having an opening for the reception of a coupler-shank, and pole-pockets 51 at the ends of said end sill; substantially as described.

34. The combination with an end sill having rearwardly-extending projections 55, of horizontal corner connection-plates 56 riveted to said projections, side sills which are secured to said end sills, and to which said connection-plates 56 are also riveted, center sills secured to the end sill, and diagonal braces connected to said center sills and to said connection-plates 56; substantially as described.

35. The combination with side sills, of an end sill projecting laterally beyond said side sills, vertical connection-plates 48 secured to the outer faces of said side sills, and corner-posts 6, riveted to said connection-plates and the side sills and to the projecting ends of the end sill; substantially as described.

36. The combination with a sheet-metal car-body, of side and center sills, an end sill connected to said side and center sills, connection-plates 59 attached to said end sill, and angle-posts secured to said connection-plates and to the end plates of the car-body; substantially as described.

37. The combination with the body portion of a hopper-bottom car, of side and center sills and an end sill, a connection-plate depending from about the center of the end plate of the car-body, vertical connection-plates secured to the end sill, and diagonal braces riveted to said connection-plates; substantially as described.

38. The combination with a hopper-bottom car-body, of side, center, and end sills, connection-plates 59 secured to the end sill, vertical posts 60 secured to said connection-plates and to the end plate of the car-body, a connection-plate 61 depending from the center of the end plate of the car-body, and diagonal braces 62 which are secured to plate 61 and to the outer vertical connection-plates 59; substantially as described.

39. The combination with a hopper-bottom car-body, of side, center, and end sills, connection-plates 59 secured to the end sill, vertical posts 60 secured to said connection-plates and to the end plate of the car-body, a connection-plate 61 depending from the center of the end plate of the car-body, diagonal braces 62 which are secured to plate 61 and to the outer vertical connection-plates 59, and rivets which pass through the posts 60 and the diagonal braces 62, at their points of intersection; substantially as described.

40. The combination with the body portion of a hopper-bottom car, of side, center, and end sills, corner-posts secured to the corners of the car-body and to the side and end sills, intermediate end posts 60 secured to the end plates of the car-body and to the end sills, and handholds or rods 63 secured to one of the corner-posts 6, and one of the intermediate posts 60; substantially as described.

41. The combination with the side, center, and end sills, of a transom for supporting the side and center sills, a cover-plate 77 riveted to said transom and center sills, corner connection-plates 56 riveted to the end and side sills, and diagonal braces 68 riveted to the corner connection-plates 56, and to the cover-plate 77; substantially as described.

42. The combination with the body portion of a hopper-bottom car, of a transversely-arranged angle-bar 12 secured to said body portion, center sills, an angle connection-plate 69 secured to said center sills, and angle-bars 70, arranged at right angles to the inclination of the bottom of the car-body, which bars 70 are secured to the angle connection-plate 69 and the depending flange of one of the transverse strengthening-bars 12 on the car-body; substantially as described.

43. The combination with the body portion of a hopper-bottom car, of a transversely-arranged angle-bar 12 secured to said body portion, center sills, an angle connection-plate 69 secured to said center sills, and angle-bars 70, arranged at right angles to the inclination of the bottom of the car-body, which bars 70 are secured to the angle connection-plate 69 and the depending flange of the transverse strengthening-bar 12 on the car-body, said angle-bars 70 being cross-braced by lattice-work; substantially as described.

44. The combination with a car-body, of side and end sills, vertical connection-plates 48, secured to the side sills, and obliquely-arranged angle-bars 72 secured to the side plates of the car, and to the connection-plates 48; substantially as described.

45. The combination with a car-body, of the angle corner-posts 6, the side sills to which said posts are connected, a connection-plate interposed between said posts and side sills, obliquely-arranged bars 72 secured to said connection-plates and attached to the side plates of the car-body, and a handhold or rod 73, connecting one of the bars 72 and one of the corner-posts 6; substantially as described.

46. The combination with a frame for supporting a car-body, of a brake-cylinder arranged thereon, an end post extending upwardly from the end sill of the frame, and a bracket 76 mounted on said end post, in which is fulcrumed the brake-lever, to which the piston-rod of the brake-cylinder is connected; substantially as described.

47. The combination with the cover-plate 77, of an angle connection-plate 78, a car-body having an angle-bar $12^c$ arranged on its under side, and obliquely-arranged angle-braces 79 connected to said angle-bar $12^c$ and to said connection-plate 78; substantially as described.

48. The combination with a car-body, of side sills, connection-plates 80 secured to said side sills, and inclined twin brace-bars 81, connected to said connection-plates and to the car-body; substantially as described.

49. The combination with a car-body, of side sills, a body-bolster, and inclined stiffening-braces extending from said car-body and connected to the side sill at the ends of the body-bolster; substantially as described.

50. The combination with a car-body, of side sills, connection-plates, inclined stiffening-braces secured to said connection-plates and to the car-body, a floor-beam on the under side of the car-body, and connection-plates for securing said floor-beam to the inclined stiffening-braces; substantially as described.

51. The combination with a car-body, of side sills, inclined stiffening-braces extending from said car-body to said side sills, a transversely-arranged floor-beam which is secured to said inclined stiffening-braces, and floor-supports secured to said beam intermediate said stiffening-braces; substantially as described.

52. The combination with a car-body, of side sills, a body-transom, a cover-plate for said transom, inclined stiffening-braces extending from the car-body to the side sills, and inclined floor-supports arranged under the car-body and attached to said cover-plate; substantially as described.

53. The combination with a car-body, of side and center sills, a body-bolster, a cover-plate for said bolster, inclined stiffening-braces extending from the car-body and secured to the side sills opposite the body-bolster, a floor-beam arranged under the car-body and secured to said inclined stiffening-braces, and floor-supports arranged upon said cover-plate and secured to said floor-beam; substantially as described.

54. The combination with a car-body, of side sills, connection-plates 80 secured to the side sills, inclined stiffening-braces arranged in pairs and secured to said connection-plates and to the car-body, connection-plates 82 arranged between said twin braces, a floor-beam which is secured to said connection-plate 82, and supports for said floor-beam intermediate the stiffening-braces; substantially as described.

55. The combination with a car-body, of side sills, connection-plates 80 secured to the side sills, twin brace-bars 81 secured to said connection-plates on the car-body, connection-plates 82 arranged between said twin braces, a transversely-arranged angle-bar $12^c$ on the under side of the car-body to which the connection-plates 82 are also secured, a cover-plate 77 and an angle-plate 78, angle-braces 79 connected to the plate 78 and the angle-bar $12^c$, connection-plates 83 extending inwardly from the plates 80, connection-plates $12^b$ secured to the upper ends of the angle-braces 79, and diagonal braces 85 connected to the plates 82 and the angle-plate 78, and to the plates 83 and $12^b$ respectively; substantially as described.

56. The combination with a car-body, of an angle-bar $12^d$ arranged transversely on its under side, and extending laterally therebeyond, side and center sills, an angle-plate 86 secured to said sills, said angle-plate being coextensive with the angle-bar 12, and lattice-work attached to said plate 86 and said bar $12^d$; substantially as described.

57. The combination with a car-body, of an angle-bar $12^d$ arranged transversely on its under side, side and center sills, an angle-plate 86 secured to said sills, said plate 86 and said bar $12^d$ extending laterally beyond the side edges of the car-body and beyond the upper faces of the side sills respectively, and angle-braces 88 connected to the side plates of the car-body and to the projecting ends of said plate 86 and said bar $12^d$; substantially as described.

58. The combination with a car-body, of an angle-bar $12^d$, arranged transversely on its under side, side and center sills, an angle-plate 86 secured to said sills, said plate 86 and said bar $12^d$ extending laterally beyond the side edges of the car-body and beyond the upper faces of the side sills respectively, angle-braces 88 connected to the side plates of the car-body and to the projecting ends of said plate 86 and said bar $12^d$, and plates 89 riveted to the side sills, to which the lower ends of the braces 88 are secured; substantially as described.

59. The combination with the side plates whose lower edges are flanged inwardly, of floor-plates resting upon, and riveted to, said flanges, the contiguous edges of said floor-plates abutting against each other, said butt-joints extending transversely the car, filling-plates arranged under the contiguous edges of the floor-plates and between the flanges of the side plates, and transversely-arranged angle or T bars extending transversely the car and riveted to the filling-plates; substantially as described.

60. The combination with a side wall of a hopper-bottom car in the form of a plate-girder, of inclined stiffening bars or braces which are arranged on the side walls to better resist the shearing forces in said side walls, and also to prevent the plates forming the side wall from buckling under action of said shearing forces; substantially as described.

61. The combination with a hopper-bottom car and its frame, the side plates of said car being in the form of plate-girders, of inclined stiffening-braces arranged at the ends of the side plates for resisting the bulging tendency of said side plates, said stiffening-braces sloping downwardly toward the supporting-bolsters of the frame; substantially as described.

62. The combination with a hopper-bottom car and its frame, of floor-supports arranged under, and at right angles to, the inclined ends of the car so that said floor-supports are subjected to direct stresses only and in line with the direction the floor tends to deflect under load, and inclined stiffening-braces at the ends of the side plates of the car for coöperating with said floor-supports in bracing the ends of the car; substantially as described.

63. The combination with a hopper-bottom car and its frame, of inclined stiffening-braces at the ends of the side walls of the car, and floor-supports for tying said stiffening-braces together, said floor-supports being arranged at right angles to the inclination of the floor of the car; substantially as described.

64. The combination with a hopper-bottom car and its frame, of inclined stiffening-braces at the ends of the side walls of the car, floor-beams for tying said stiffening-braces together, and intermediate floor-supports arranged at right angles to the inclination of the floor of the car, said floor-supports being secured at their lower ends to the framing of the car; substantially as described.

65. The combination with a hopper-bottom car and its under frame, of exteriorly-arranged inclined stiffening-braces at the ends of the side walls of the car, floor-beams which are secured directly to the bottom plates of the car and which project laterally beyond the side plates and are attached to the inclined stiffening-braces, tying said stiffening-braces together, an angle superimposed upon the car-framing, and intermediate floor-supports connected to said floor-beam and said angle; substantially as described.

66. The combination with the side plates of a car, of side sills formed with parallel angles, the side plates of the car being connected to said angles and forming the web of the side sill, a body-bolster for carrying the parallel members constituting the side sills, a connection-plate opposite the body-bolster, which connection-plate forms the web of the side sill, and inclined stiffening-braces secured to the side plates of the car and to said connection-plates; substantially as described.

67. The combination with a hopper-bottom car, of side and center sills, the side walls of the car being secured directly to the side sills, inclined stiffening-braces at the ends of the side walls of the car, said stiffening-braces being also secured to the side sills, floor-beams connected at their ends to said inclined stiffening-braces, and parallel floor-supports extending from the center sills to the floor-beams; substantially as described.

68. The combination with a hopper-bottom car, of the side and center sills, inclined stiffening-braces on the ends of the side walls of the car, said stiffening-braces being secured to the side sills, floor-beams which are secured at their ends to said inclined stiffening-braces, connection-plates arranged above the center sills, and parallel floor-supports connected to said connection-plates and to said floor-beams, said floor-supports being arranged at right angles to the inclination of the floor of the car; substantially as described.

69. The combination with the side wall of a car in the form of a plate-girder, of supports therefor consisting of bolsters, tension members extending horizontally from each bolster to the plate-girder, and compression members extending upwardly from the bolsters to the plate-girder for supporting the same, substantially as described.

70. The combination with the side wall of a car in the form of a plate-girder, of a support therefor in the form of a bolster, a tension member extending substantially horizontally from the bolster to the plate-girder and attached to each of said parts, and an inclined support which extends from the bolster to the plate-girder side, said support being placed under compression under load and attached directly to the plate-girder side and said bolster, substantially as described.

71. The combination with the side wall of a car in the form of a plate-girder, of a bolster, members attached to said bolster and to the side wall of the car, said members being placed in tension and compression, respectively, under load, and forming a triangular truss-support for the plate-girder, substantially as described.

72. In a car, the combination with the side walls in the form of plate-girders, of bolsters, floor-supports under compression and supported upon the bolsters, and side sills under tension attached to the bolsters and to the deep portions of the plate-girder sides, substantially as described.

73. In a car, the combination with the side walls in the form of plate-girders, of bolsters, floor-supports which are under compression under load, and side sills which are placed under tension, said floor-supports and side sills being attached to the bolster and to the car-body, forming supporting-trusses for said body, substantially as described.

74. In a car, the combination with the side walls in the form of plate-girders, of bolsters, inclined floor-supports which are placed under compression under load, and center sills which are placed under tension under load, substantially as described.

75. In a hopper-bottom car, the combination with the body portion located above the supporting-bolsters, of supporting-bolsters, tension members in the form of side and center sills, attached to said bolster and to said body portion, said center sills extending through the lower portion of the car-body, and compression members in the form of floor-frames and stiffeners, all of which are attached at one extremity of the body-bolsters and at the other extremity to the car-body, said parts forming supporting-frames for carrying the car-body on the bolsters, substantially as described.

76. In a car, the combination with the side walls in the form of plate-girders and inclined floor-plates, of body-bolsters arranged under said inclined floor-plates, inclined floor-supports extending from said floor-plates to the body-bolsters, side sills attached to the bolsters and to the plate-girder sides, and center sills attached to said bolsters, said floor-supports being placed under compression under load, and said side and center sills being placed under tension under load, substantially as described.

77. In a car, the combination with plate-girder sides and the floor-plates, of supporting-bolsters at or near each end of the car, inclined stiffening-braces, floor-beams carried by said inclined stiffening-braces and located longitudinally between said bolsters, inclined floor-supports extending downwardly and supported upon the bolsters, and horizontal tension members forming, with said inclined floor-supports, supporting-trusses, substantially as described.

78. In a car, the combination with the side walls in the form of plate-girders, of floor-plates, inclined stiffening-braces, floor-beams carried by said inclined stiffening-braces and located longitudinally between the body-bolsters, inclined stiffening-braces which extend downwardly, and which are attached directly to the ends of the bolsters, floor-beams carried by said last-mentioned stiffening-braces, inclined floor-supports attached to said floor-beams and to the bolsters, and side and center sills, substantially as described.

79. The combination with a car-body whose side walls are in the form of plate-girders, of supporting-bolsters, compression members extending from said bolsters to support the car-body, and side sills which are in tension under vertical load, said side sills being connected to the supporting-bolsters and to the plate-girders, said side sills also forming tension-flanges for the deepest portions of said plate-girders; substantially as described.

80. The combination with a car-body whose side walls are in the form of plate-girders, of supporting-bolsters, compression members extending from said bolsters to support the body, and compound tension members connected to the bolster and to said plate-girders; substantially as described.

81. The combination with a car-body whose side walls are in the form of plate-girders, of supporting-bolsters, compression members extending from said bolsters to support the body, and compound tension members connected to the bolsters and to said plate-girders, said compound tension members having flanges which extend in opposite directions from the webs of the plate-girders, and serve as tension-flanges for the deepest portions thereof; substantially as described.

82. The combination with a car-body whose side walls are in the form of plate-girders, of supporting-bolsters, compression members extending from said bolsters to support the body, tension members connected to said bolsters and to said plate-girders, inclined hopper-plates, and reinforcing-plates 18 extending inwardly from the lower edges of the deep portions of the plate-girders to the inclined hopper-plates, which are thereby strengthened against lateral pressure, said plates 18 also serving as a portion of the tension-flange for said plate-girder; substantially as described.

In testimony whereof I hereunto affix my signature, in the presence of two witnesses, this 14th day of February, 1900.

GEORGE I. KING.

Witnesses:
F. R. CORNWALL,
WM. H. SCOTT.